United States Patent [19]
Blas

[11] 3,933,101
[45] Jan. 20, 1976

[54] ANCHORING MECHANISM FOR ANCHORING OF FREIGHT CONTAINERS

[75] Inventor: Günter Blas, Faistenhaar, Germany

[73] Assignee: Messerschmitt-Bolkow-Blohm GmbH, Munich, Germany

[22] Filed: Aug. 5, 1974

[21] Appl. No.: 494,467

[30] Foreign Application Priority Data
Aug. 9, 1973 Germany............................ 2340315

[52] U.S. Cl............ 105/366 B; 105/465; 244/137 R
[51] Int. Cl.² ............................................ B60P 7/08
[58] Field of Search ............ 105/366 R, 366 B, 463, 105/464, 465; 244/137 R, 118 R

[56] References Cited
UNITED STATES PATENTS

| | | | |
|---|---|---|---|
| 3,357,372 | 12/1967 | Bader.................................. | 105/464 |
| 3,465,998 | 9/1969 | Ginn ................................... | 105/464 |
| 3,493,210 | 2/1970 | Brenner........................ | 105/465 X |
| 3,693,919 | 9/1972 | Alberti et al................ | 105/366 B X |
| 3,698,679 | 10/1972 | Lang et al........................... | 105/465 |
| 3,759,476 | 2/1972 | Goodwin........................ | 105/465 X |
| 3,800,713 | 1/1973 | Nordstrom.......................... | 105/465 |

*Primary Examiner*—M. Henson Wood, Jr.
*Assistant Examiner*—Gene A. Church
*Attorney, Agent, or Firm*—Woodhams, Blanchard and Flynn

[57] ABSTRACT

Anchoring mechanism for aircraft freight decks. Normally erect anchoring devices are provided on the freight deck of an aircraft which devices will automatically yield to the passage of freight containers or pallets across same and will automatically become reerected after such have passed. There is provided in a suitable recess in the deck of the aircraft a first lever system for sensing and responding to the presence of a pallet or container and a second lever system including a hook which when desired can be caused to enter into an appropriate recess in a container for holding same snugly to such deck. Such lever systems are interconnected in such a manner that pivotal movement of the first such system against a resilient force in response to the presence of a container or pallet will automatically fold the second lever system into its retracted position and then release same for return to operating position upon the passage of such pallet or a container. A spring-loaded claw holds the second lever system normally in its operating position within the floor recess but when released permits sufficient pivotal withdrawal of the locking hooks to expose rollers mounted on vertical axes for the guidance as desired of pallets or containers without engagement therewith by the clamping hooks.

4 Claims, 5 Drawing Figures

ANCHORING MECHANISM FOR ANCHORING OF FREIGHT CONTAINERS

FIELD OF THE INVENTION

The invention relates to an anchoring mechanism with a pivotal locking hook for anchoring of freight containers, in particularly in an aircraft.

BACKGROUND OF THE INVENTION

When freight containers, for example pallets or shipping containers, are loaded into an aircraft, the surface of the freight deck must be free of obstacles. For this reason the locking hooks of common anchoring mechanisms are constructed pivotally so that they can be retracted below the surface of the freight deck. The pivoting of each individual locking hook is in the present practice done manually. Since in one freight aircraft there are installed up to some hundreds of such anchoring mechanisms, this is a time consuming and expensive operation.

In order to arrange the anchoring mechanisms in such a manner that they do not lie above the deck of the cargo compartment, it has already been suggested to provide guides for said anchoring mechanisms. However, these add weight and require additional room. To avoid these disadvantages, a further known suggestion (DAS) 1 531 387) provides for a cover which extends along the fuselage and is used to receive the locking members of the anchoring device. Same projects beyond the fuselage deck to the outside of each laterally outer longitudinal support. Projections are provided in the cover, which projections grip over the side edges of the pallets introduced into the freight compartment and secure said pallets against movement. This known device has the disadvantage that one often cannot fully use the deck of the freight compartment, because pallets of differing widths cannot be loaded.

The basic purpose of the invention is to produce an anchoring mechanism of the above-mentioned type which does not need to be retracted individually and again erected by the operators. Furthermore the anchoring mechanism is intended to permit the loading of the aircraft with freight containers of various widths without requiring changes in the cargo compartment.

SUMMARY OF THE INVENTION

This purpose is attained according to the invention by constructing the anchoring mechanism in such a manner that it is lowered automatically when freight containers are moved in and when it contacts said freight containers and automatically is erected again after the freight containers have passed.

Such a construction of the anchoring mechanism can, according to an exemplary embodiment of the invention, be obtaind by providing a bar on one arm of a pivotally mounted, two-arm lever, which bar is located above the surface of the freight deck and has two inclined contact faces, so that an approaching freight container pivots the lever about its pivotal axis, and by providing that the other arm of the lever is rotatably connected to the swingable locking hook in such a manner that it pivots the locking hook about its axis of rotation and thus moves it below the surface of the freight deck. The anchoring mechanism can contain guide rollers in a conventional manner, along which move the freight containers. In order to assure that, when several loading lines are used comprising freight containers of differing widths, the guide rollers are retracted simultaneously with the locking hook below the surface of the freight deck, the invention provides that on both sides of the locking hook there are provided rollers which are rotatable about vertical axes, same being held in roller holders which are pivotal about horizontal shafts. Said shafts are in alignment with the axis of rotation of the locking hook. A catch which is connected to the locking hook is received into slots of the roller holders, so that the roller holders are carried along during pivoting of the locking hook.

The independent reerecting of the anchoring mechanism is achieved according to the invention by placing the lever under the initial tension of a spring which exerts a pressure on said lever in the direction of its initial erected position.

It may sometimes be necessary, for example when containers with pockets are loaded onto the aircraft, to tilt the locking hook temporarily somewhat backwardly in order to keep the front edge of the guide rollers free from obstacles. This is achieved according to a further embodiment of the invention by supporting the locking hook in a fork which is pivotal about the axis of rotation of the lever, which fork can be locked by a rotatable claw and can be swung in unlocked condition under a spring tension sufficiently that the nose of the locking hook will lie behind the front edge of the guide rollers.

DETAILED DESCRIPTION

Figure 1:
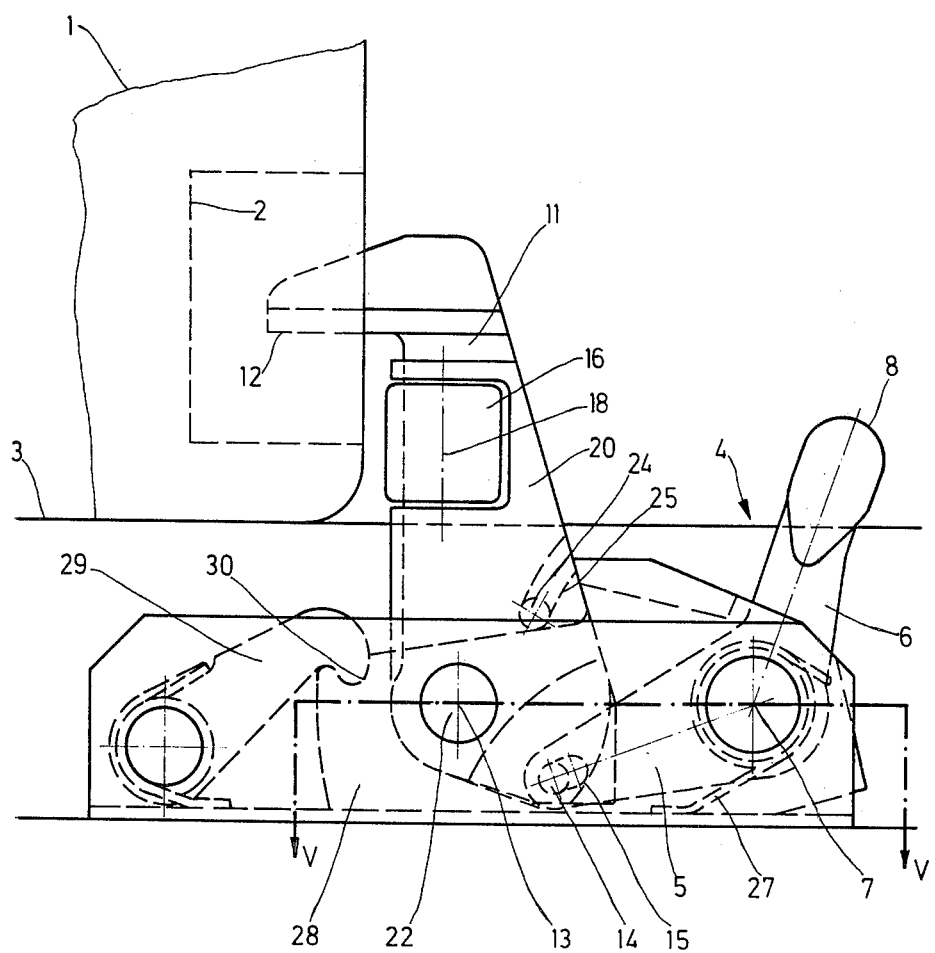
FIG. 1 is a side view.
Figure 2:
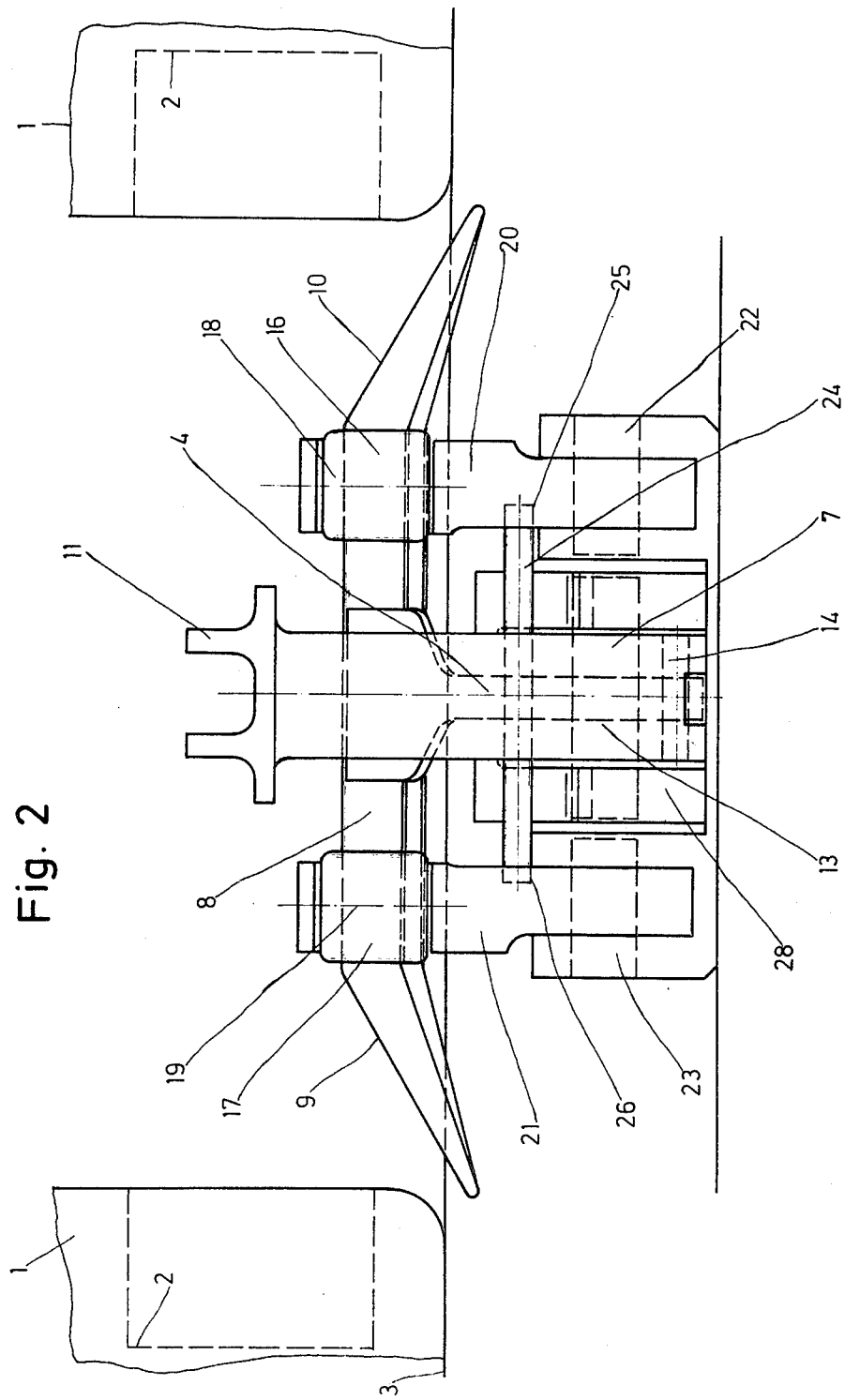
FIG. 2 is a front view of the anchoring mechanism.

In FIGS. 1 and 2, reference numeral 1 illustrates a freight container, for example a container which has pockets 2 at various points over its periphery. The deck 3 of the freight compartment is advantageously formed by a number of rollers or ball elements (not illustrated), which permit an easy movement of the freight containers.

The inventive anchoring mechanism contains a two-arm lever 4, which has the arms 5 and 6 and which is pivotal about the axis 7. A bar 8 with two inclined contact faces 9 and 10 is provided on the arm 6 of the lever 4. As can be seen from FIG. 2, the contact faces 9 and 10 are so arranged that they are pressed down by contact during loading or unloading of the freight container 1 and the freight container thereby pivots the lever 4 about its horizontal axis 7.

A locking hook 11 has a nose 12 and is pivotal about the horizontal axis 13 which lies at the same height as the pivot axis 7 of the lever 4. The locking hook 11 and the lever 4 are hingedly connected by a pin 14 which is arranged in a slotted hole 15 of the arm 5 of the lever 4.

On both sides of the locking hook 11, rollers 16 and 17 with vertical axes 18 and 19 are arranged in roller holders 20 and 21. These roller holders are pivotal about horizontal shafts 22 and 23, which are in alignment with the axis of rotation 13 of the locking hook 11. A catch 24 which is fixed to the locking hook 11 is received into slots 25 and 26 of the roller holders 20, 21, so that the roller holders 20, 21 are carried along during a pivoting of the locking hook 11.

A torsion spring 27 is secured on the lever 4 so that its initial tension urges the lever 4 toward its erected initial position, as illustrated in FIG. 1.

The locking hook 11 is supported in a pivotal fork 28, which in turn is pivotal about the axis of rotation 7 of the lever 4. A claw 29, which is pivotally supported in the housing of the anchoring mechanism, engages a groove 30 of the fork 28 and locks it in the position illustrated in FIG. 1.

When the claw 29 is released manually or by a foot lever (not illustrated), the locking hook 11 pivots under the action of a spring (not illustrated) sufficiently to the right that its nose 12 will lie behind the front edge of the guide rollers 16, 17. This permits movement of freight containers with pockets along the rollers 16, 17 and after they reach their desired position, the noses 12 of the locking hooks 11 engage the pockets 2 of the freight containers.

Figure 3:
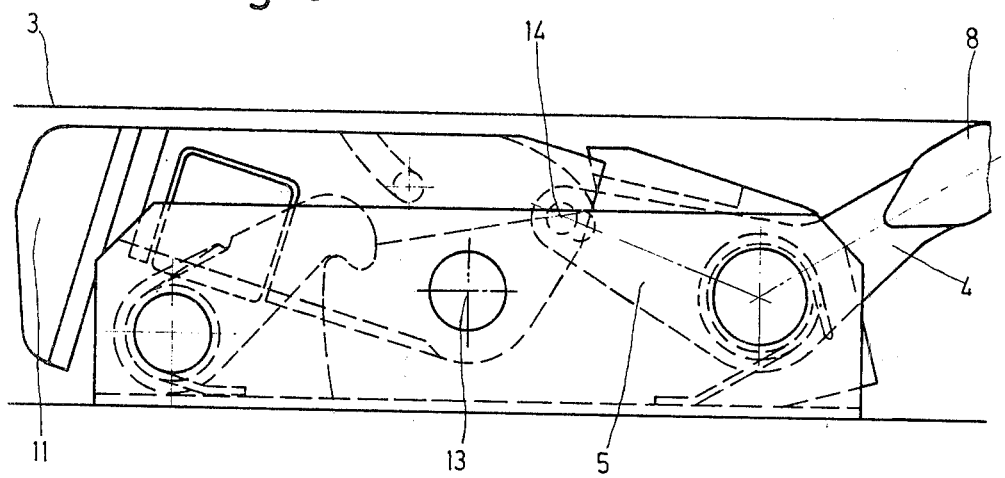
FIG. 3 illustrates the anchoring mechanism in folded, or retracted, position.

FIG. 3 illustrates the anchoring mechanism in folded position or the position when retracted in the floor of the freight compartment. The lever 4 is swung in such a manner that its arm 5 is directed upwardly, whereby it has acted through the pin 14 to pivot the locking hook 11 about its axis 13 sufficiently that same will lie below the floor 3 of the freight compartment.

Figure 4:
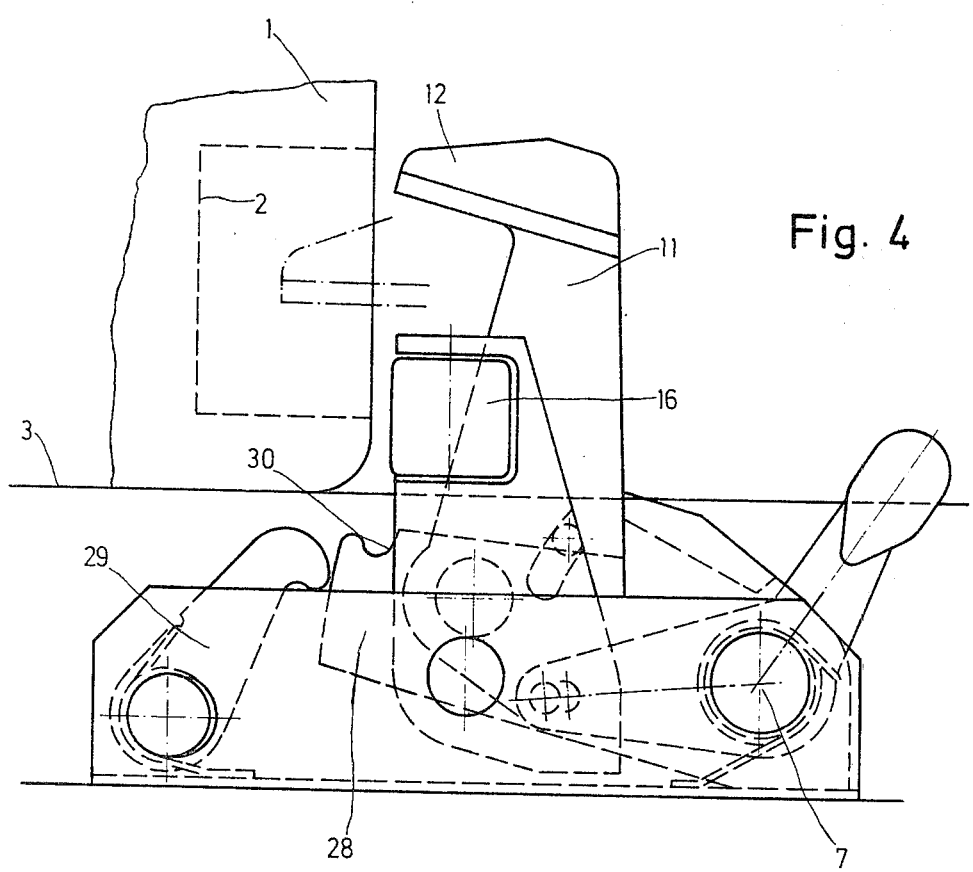
FIG. 4 illustrates the anchoring mechanism in unlocked position.
Figure 5:
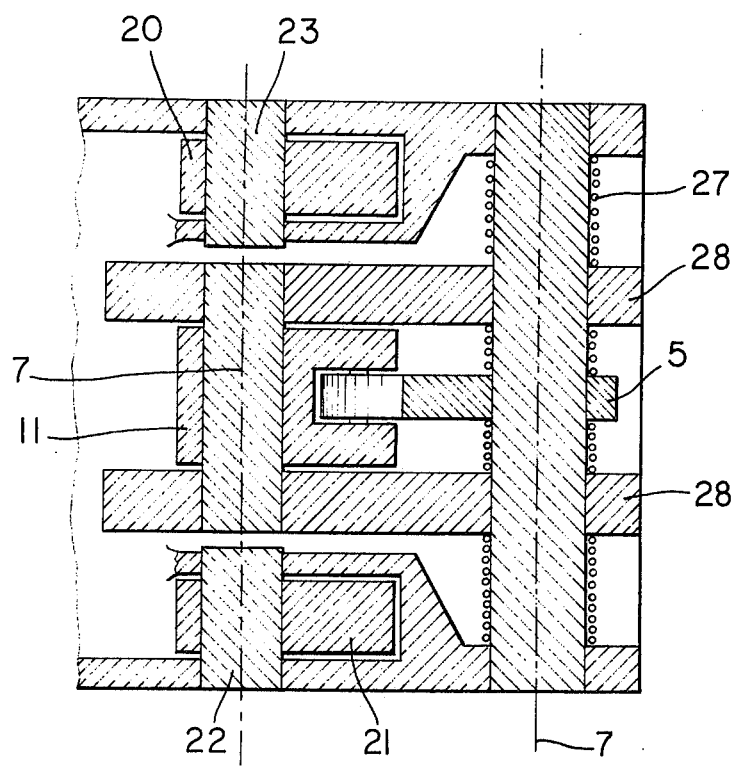
FIG. 5 is a section taken on line V—V of FIG. 1.

FIG. 4 illustrates the position of the anchoring mechanism in which the claw 29 is swung out of the groove 30. The pivotal fork 28 is here pivoted by spring force about the axis of rotation 7 sufficiently to the right that the nose 12 of the locking hook 11 will lie behind the front edge of the guide rollers 16, 17.

A freight container with pocket 2 is illustrated by reference numeral 1 in FIG. 4; it can be seen from the dash-dotted position of the nose 12 that it can be swung into the pocket 2 of the container when same is in its final position.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. An anchoring mechanism having a pivotal hook for engaging and anchoring freight containers to flooring in an aircraft, comprising:
    a two arm lever pivotally supported for movement about a first pivot axis having a bar secured to one arm and extending above the surface of said flooring, said bar having a pair of inclined contact faces for engaging a moving freight container, said moving freight container effecting a pivoting of said lever about said first pivot axis when said freight container engages said two arm lever, the other arm of said two arm lever being rotatably connected to a locking hook pivotally supported on said flooring for movement about a second pivot axis between positions above and below said surface of said flooring, said locking hook being pivotal in response to a pivoting movement of said two arm lever to effect a movement of said locking hook to a position below the surface of said flooring.

2. An anchoring mechanism according to claim 1, wherein rollers are mounted on both sides of said locking hook in roller holders, said rollers being rotatable about vertical axes in said roller holders, said roller holders being pivotally supported for movement about horizontal axes parallel to said second pivot axis for said locking hook;
    wherein a catch is fixed to said locking hook and is adapted to be received in slots in said roller holders, so that said roller holders are moved in response to a pivoting of said locking hook.

3. An anchoring mechanism according to claim 1, wherein said two arm lever is under an initial tension of a spring which exerts a force on said two arm lever in the direction of an initial erected position of said two arm lever.

4. An anchoring mechanism according to claim 1, wherein said second pivot axis for said locking hook is mounted in a fork which is pivotal about said first pivot axis for said two arm lever; and
    including a pivotally supported claw resiliently urged into releasable engagement with said fork to hold said two arm lever and said roller holders together, said claw, when released from engagement with said fork against said resilient urging facilitating a relative movement between said locking hook and roller holder so that a nose of said locking hook will lie behind the front edge of said rollers.

* * * * *